Dec. 26, 1967  R. SCHWESIG  3,360,216
FLEXIBLE ROCKET TAIL ASSEMBLY
Filed July 19, 1966
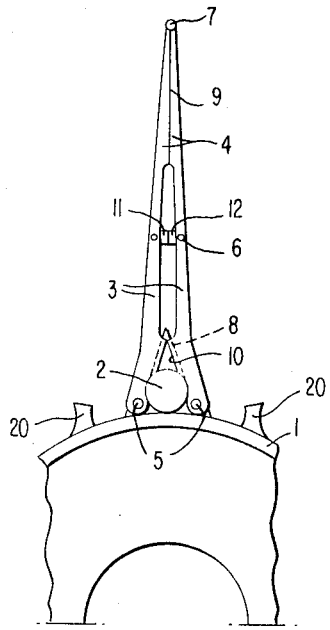
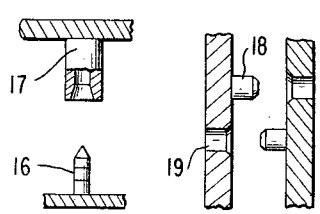
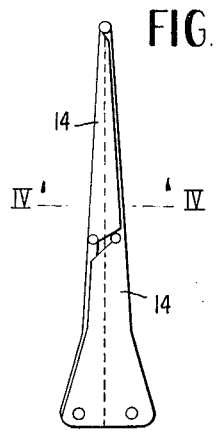
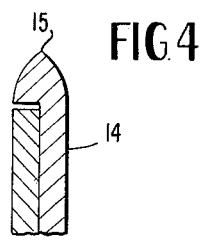
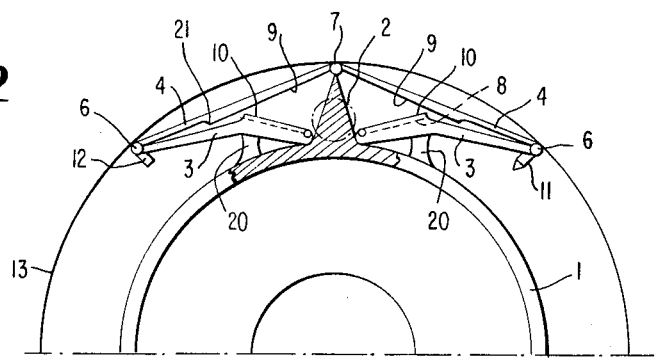
INVENTOR
REINHOLD SCHWESIG
BY Dicke & Craig
ATTORNEYS United States Patent Office 3,360,216
Patented Dec. 26, 1967

3,360,216
FLEXIBLE ROCKET TAIL ASSEMBLY
Reinhold Schwesig, Gerzen-Buchenbrink, assignor to
Dynamit Nobel Aktiengesellschaft, Troisdorf, Germany
Filed July 19, 1966, Ser. No. 566,284
Claims priority, application Germany, Aug. 3, 1965,
D 47,883
20 Claims. (Cl. 244—3.29)

The present invention relates to a collapsible tail assembly for rockets. More particularly, the present invention relates to a rocket tail assembly having fins, each of which comprises oppositely collapsible mating portions. More specifically, the present invention relates to such a tail assembly wherein the mating portions engage each other when they are extended so that conventional rigidly constructed stops are not required and wherein the fin is mounted at the nozzle portion of the rocket so that it may be folded within the calibre of the rocket.

In the prior art, collapsible fins for rocket tail assemblies have been used so that the rockets may be stored in and fired from launcher barrels for compactness. Usually, the foldable fins are folded within or close to the calibre of the rocket while the rocket is within the storage and launcher barrel. During firing, the tail assembly is automatically extended after the rocket has emerged from the launcher; usually, the fin of the rocket is extended by rotating or pivoting it about an axis that is parallel or at right angles, respectively, to the axis of the rocket. In the prior art constructions, the erection of the fins is limited by rigid stops; a considerable reinforcement of the fin inner portion is generally necessary to prevent breakage of the fins when they strike the limiting stops. Also, it may be necessary to provide specific means for reducing the impact of the fins against the stops and for damping any resultant vibration so that the flight of the rocket will no be influenced in an undesirable manner by a particularly hard and uneven impact of the fins upon the stops. Furthermore, the prior art constructions can only accommodate a relatively small fin within the calibre of the rocket in the collapsed position, which results in a rather inefficient extended tail assembly.

It is an object of the present invention to overcome many of the above-mentioned disadvantages by providing a particularly advantageous collaspsible rocket tail assembly.

Another object of the present invention is to provide a collapsible tail assembly at the central thrust nozzle of a rocket so that particularly large fins may be accommodated within the rocket calibre, while effectively eliminating many of the above-mentioned disadvantages and drawbacks.

A further object of the present invention is to provide a collapsible tail assembly that employs oppositely collapsible mating fin portion for each fin so that erection stops and rigid construction or other means used solely for the engagement of the fin with the stop are no longer necessary.

According to the present invention, the collapsible fins of the tail assembly are located within the area of the thrust nozzle, and each fin is divided in its central axial plane into two approximately mirror-symmetrical halves; each of these halves is subdivided into two approximately equal inner and outer portions at approximately the center of the radial extension of the half in a direction parallel to the rocket axis. For each fin, the outer ends of the outer portions are hinged together, the inner ends of the inner portions are hinged to the rocket nozzle wall, and the inner and outer portions of each half are hinged together at their remaining ends. Preferably, the hinges will have axes parallel to the rocket axis and two inner portions will be pivoted at equal distances from the central fin plane for rotation in opposite directions against a constantly urging erection spring means.

According to the above-memtioned structure of the present invention, no one fin is pivoted about any single axis and a fully extended fin is not pivoted about an axis. The fin of the present invention is collapsed in two halves that are approximately equal and symmetrical to the central fin plane so that outermost fin edge moves precisely in the central fin plane, which coincides with an axial plane of the rocket, that is, the outermost fin edge moves in precisely a radial direction during collapsing and erection; therefore, no torsional moments will be exerted upon the rockets that could adversely affect the rocket trajectory. In addition, any stop to limit the erection of the fin is rendered unnecessary by the construction of the present invention, because the erecting movement of the fin will be limited automatically by the engagement of the two fin halves with each other.

According to one embodiment of the present invention, it is proposed to secure the inner portions of the two fin halves of each fin to the outer nozzle wall at distances from one another that will insure an adequate mounting to meet any stresses encountered by the fin. It is further proposed that the fin mounting employ a stop on the nozzle wall positioned between the two fin halves to accurately position the fin in the collapsed position; also, it is proposed that the stop should have a wedge-shaped cross-section tapered toward the outside for engagement with the fin halves in the erected position to precisely determine the erected position of the fin. The wedge-shaped stop may be provided as a continuous ledge or ridge extending over the entire fin length; also, it is contemplated that the wedge-shaped stop may comprise a wedge-shaped stop member at each of the forward and rearward fin ends.

In order to prevent any possible separating of the fin halves during flight, which would be caused by the relatively high wind velocity, it is further proposed to provide the outer portion of one fin half and the inner portion of the other fin half of each fin with lateral projections that will respectively overlap the corresponding part of the other fin half at the forward edge of the fin, when the fin is in the erected position. To improve flight characteristics, it is proposed that the forward edge of each lateral projection may be tapered in the forward direction to provide a knife edge that is symmetrical with respect to the central fin plane. To further assure that there would be no gapping of the fin halves during flight of the rocket, it is contemplated that suitable arresting means may be employed, for example, elastically mounted snap-acting or locking elements.

It is also contemplated that the tail assembly of the present invention may employ suitable stop means for some or all of the hinged connections for precisely determining the collapsed position of the fin; the stops would limit the collapsed angular position of the fin portion. It is contemplated that the previously mentioned wedge-shaped stop may be employed in the collapsed position of the fin to engage the fin and prevent excessive stress on the hinge connections. For precisely determining the erected position, it is contemplated that one or more pins may be mounted on one or both of the inner surfaces of the outer or inner portions of the fin halves for engagement with correspondingly located and constructed recesses on the corresponding other portions when the fin is erected; this construction has the additional effect of reinforcing the erected fin.

Further objects, features and advantages of the present invention will appear from the following specification in connection with the accompanying drawing and in which:

FIGURE 1 is a nozzle end view of a tail assembly according to the present invention, showing one fin in the erected position, with portions broken away, for purposes of illustration;

FIGURE 2 is a view similar to FIGURE 1, but with the fin in the collapsed position, and only one fin being shown for purposes of illustration;

FIGURE 3 shows a modification of the present invention in a view similar to FIGURE 1 showing the overlapping lateral projections;

FIGURE 4 is a cross-sectional view, on an enlarged scale; taken along line IV—IV of FIGURE 3; and FIGURE 5 illustrates two embodiments of a centering and locking pin in longitudinal cross-sectional views through the outer parts of the fin halves.

In the embodiments according to FIGURES 1 and 2, the nozzle wall 1 of the rocket is provided with a wedge-shaped stop member 2, which is shown as an integral projection of the nozzle wall 1. The fin is mounted within the area of the central thrust nozzle and subdivided in the axial central fin plane into two generally mirror-symmetrical fin halves. Each of these fin halves is subdivided into an inner portion 3 and an outer portion 4 approximately in the center of the radial extension of the fin half in a direction substantially parallel to the rocket axis. The innermost ends of the inner portions 3 are pivotally mounted by hinge means 5 to the nozzle wall 1 at substantially equal distances on opposite sides of the wedge-shaped stop 2. The adjacent ends of the inner and outer portions of each fin half are pivotally connected with each other by means of the hinges 6. The outer ends of the outer portions 4 of each fin are pivotally connected with each other by means of the hinge 7. The hinged connections 5, 6 and 7 allow the inner portions 3 and the outer portions 4 to pivot between an erected position as shown in FIG. 1 and a collapsed position as shown in FIG. 2. Suitable spring means are employed to normally urge the fin into the erected position, for example, springs 8 are imbedded into the wedge-shaped stop member 2 and each of the inner portions 3 to exert a constant force upon the inner portions 3 and, by way of the inner portions 3, also upon the outer portions 4 so that the fin halves will be urged into the extended position as shown in FIG. 1. In the extended position of FIG. 1, the springs will resiliently press the fin halves against each other so that the outer portion surfaces 9 will engage each other and so that the inner portion surfaces 10 will engage against the lateral surfaces of the wedge-shaped member 2. Instead of the illustrated springs, suitable helical springs may be employed. Interengaging means comprising a pin 11 and a correspondingly shaped recess 12 are mounted on respective outer portions 4 adjacent to the hinge 6 for aligning the fin halves and for reinforcing the erected fins. In addition, the interengaging means 11, 12 may space the fin halves relative to each other.

As shown in FIGURE 2, the fin halves, including the inner portions 3 and the outer portions 4, are constructed and mounted so that in the collapsed position they are accommodated within the space between the nozzle wall 1 and the rocket calibre 13. The wedge-shaped member 2 is constructed so that it will provide a seat at its apex for the hinge 7 in the collapsed position of the fin; this will precisely define the collapsed position of the fin and assure that it will always assume the same position when it is collapsed. Also, it is contemplated that in the alternative or in addition, each of the hinges 5, 6, and 7 may be provided with stops for limiting the angular relationship of the inner portions 3 and outer portions 4, in the collapsed position. For example, stops 20 may be provided on the nozzle wall 1 for limiting the angular position of the inner portion 3 when it is pivoted about the hinge 5 to its collapsed position, and a suitable projection or other stop, for example, 21, may be employed for limiting the angular position of the inner portions 3 and outer portions 4 relative to their respective hinges 6 in the collapsed position. It is contemplated that the stops may be built into and a part of the various hinges.

In the embodiment according to FIGURE 3, the fin is constructed of two halves, each comprising inner portions and outer portions pivotally connected together in the same manner as described in regard to the embodiment in FIG. 1. The fin according to FIGURE 3 is shown in a forward end view. In the drawing, the left one of the outer portions 4 and the right one of the inner portions 3 are each provided with a lateral projection 14 overlapping the adjacent forward end face of the corresponding other portions 4 and 3, respectively, so that the gap between the two fin halves is almost completely covered when the fin is erected. With this construction, the wind is prevented from entering the gap and separating the two fin halves to push the two halves apart. To increase this effect and improve the air flow characteristics, the projections 14 are provided with a forwardly tapered knife edge 15, which is generally symmetrical with respect to the central fin plane as shown in FIG. 4.

The interengaging means 11, 12 that were described in regard to FIG. 1 may be employed in the embodiment according to FIGURE 3. Two embodiments of the interengaging means are shown in FIGURE 5. In one embodiment, a bushing 17 having a recess is provided on one of the outer portions for receiving a correspondingly shaped pin 16 mounted on the other of the outer portions. In the other embodiment, a pin 18 is mounted on each of the outer portions, for engagement in correspondingly shaped and correspondingly located recesses 19 mounted on each of the outer portions. Because the pins and holes will move relative to each other along arcuate paths when the fins are moved between their collapsed and erected positions, the hinges and/or the pins may be resiliently constructed or mounted to facilitate the insertion and retraction of the pin into and from their respective recesses. Also, it is contemplated that instead of using pins and recesses having a circular cross-section, the interengaging means may comprise a pin or the like flattened on both sides and a correspondingly shaped flat slot or the like to present interengaging cam surfaces for centering and locating the fin halves during erection of the fin. It is contemplated that the fins and recesses may be constructed to correspond to the arcuate path on which they move toward and away from each other. As shown in FIGURE 5, the pins 16, 18 and the recesses 17, 19 are provided with cam surfaces for aligning the fin halves, if the pins and recesses engage off center.

It will be appreciated that numerous changes and modifications in the invention may be made by those having ordinary skill in the art over the specific constructions in the illustrative embodiments, which fall within the spirit and scope of the present invention as defined by the following claims.

I claim:
1. A fin tail assembly for a rocket having a central thrust nozzle, comprising: a plurality of fins having an axial central fin plane mounted within the area of the central thrust nozzle on the outer wall of the rocket; each of said fins being subdivided in the axial central fin plane into two essentially mirror symmetrical fin halves; each of said fin halves being subdivided into an inner portion and an outer portion approximately in the center of the radial extension thereof in the direction substantially parallel to the rocket axis; each of said fin halves including first hinge means having an axis substantially parallel to the rocket axis for pivotally connecting said inner and said outer portions together; each of said fins including second hinge means having an axis substantially parallel to the rocket axis for pivotally connecting together said outer portions; each of said inner portions including third hinge means for connecting the respective inner portion to the outer nozzle wall of the rocket at substantially identical distances from its central axial plane for pivoting the inner portions of each fin in opposite directions away from their axial central fin plane about axes substantially parallel to the rocket axis from an erected posi- tion to a collapsed position; and each of said fins having spring means for constantly urging said fin halves together toward the erected position.

2. A fin tail assembly, according to claim 1, wherein each of said fins includes an outwardly tapered wedge-shaped stop means for mounting on the outer nozzle wall between said inner portions; and said stop means having substantially mirror symmetrical opposite surfaces for engaging corresponding surfaces of said fin halves when the corresponding one of said fins is moved to its erected position.

3. A fin tail assembly according to claim 1, wherein for each fin the outer portion of one of said fin halves and the inner portion of the other of said fin halves are each provided, at their forward edges, in the direction of the flight of the rocket, with lateral projection means for overlapping the forward edge of the outer portion of the said other of said fin halves and of the inner portion of the said one of said fin halves, respectively, when the corresponding fin is in its erected position.

4. A fin tail assembly according to claim 2, wherein for each fin the outer portion of one of said fin halves and the inner portion of the other of said fin halves are each provided, at their forward edges, in the direction of the flight of the rocket, with lateral projection means for overlapping the forward edge of the outer portion of the said other of said fin halves and of the inner portion of the said one of said fin halves, respectively, when the corresponding fin is in its erected position.

5. A fin tail assembly according to claim 3 wherein each of said lateral projection means has a forwardly tapered knife edge that is symmetrical with respect to the axial central plane of the corresponding fin.

6. A fin tail assembly according to claim 4, wherein each of said lateral projection means has a forwardly tapered knife edge that is symmertical with respect to the axial central plane of the corresponding fin.

7. A fin tail assembly according to claim 1, wherein each of said hinge means includes stop means for limiting the collapsed pivoted position of the corresponding portion.

8. A fin tail assembly according to claim 2, wherein each of said hinge means includes stop means for limiting the collapsed pivoted position of the corresponding portion.

9. A fin tail assembly according to claim 3, wherein each of said hinge means includes stop means for limiting the collapsed pivoted position of the corresponding portion.

10. A fin tail assembly according to claim 4, wherein each of said hinge means includes stop means for limiting the collapsed pivoted position of the corresponding portion.

11. The fin tail assembly according to claim 1 wherein for each of said fins, one of said outer portions includes a pin mounted on its surface adjacent said first mentioned hinge means and facing the axial central fin plane and the other of said outer portions includes a correspondingly shaped and located recess for receiving said pin in the erected position.

12. The fin tail assembly according to claim 2, wherein for each of said fins, one of said outer portions includes a pin mounted on its surface adjacent said first hinge means and facing the axial central fin plane and the other of said outer portions includes a correspondingly shaped and located recess for receiving said pin in the erected position.

13. The fin tail assembly according to claim 3, wherein for each of said fins, one of said outer portions includes a pin mounted on its surface adjacent said first hinge means and facing the axial central fin plane and the other of said outer portions includes a correspondingly shaped and located recess for receiving said pin in the erected position.

14. The fin tail assembly according to claim 5, wherein for each of said fins, one of said outer portions includes a pin mounted on its surface adjacent said first hinge means and facing the axial central fin plane and the other of said outer portions includes a correspondingly shaped and located recess for receiving said pin in the erected position.

15. The fin tail assembly according to claim 7 wherein for each of said fins, one of said outer portions includes a pin mounted on its surface adjacent said first hinge means and facing the axial central fin plane and the other of said outer portions includes a correspondingly shaped and located recess for receiving said pin in the erected position.

16. A fin tail assembly for a rocket comprising: a plurality of fins mounted on the rocket; each of said fins having an axial central fin plane and being subdivided in substantially the axial central fin plane into two substantially mirror symmetrical fin mating portions; each of said fin mating portions including hinge means for connecting it to the rocket at substantially identical distances from its central axial plane for pivoting the mating portions of each fin in opposite directions away from their axial central fin plane about axes substantially parallel to the rocket axis from an erected position to a collapsed position.

17. The fin tail assembly of claim 16, wherein each of said fins has spring means for constantly urging said fin mating portions toward the erected position.

18. The fin tail assembly of claim 16 wherein each of said fin mating portions is subdivided into inner portion and an outer portion approximately in the direction substantially parallel to the rocket axis; each of said fin mating portions includes first hinge means having an axis substantially parallel to the rocket axis for pivotally connecting said inner and said outer portions together; each of said mating portions includes second hinge means having an axis substantially parallel to the rocket axis for pivotally connecting together said outer portions.

19. The fin tail assembly of claim 18, wherein each of said fins has a spring means for constantly urging said fin mating portions toward the erected position.

20. A fin tail assembly according to claim 18 wherein for each fin the outer portion of one of said fin mating portions and the inner portion of the other of said fin mating portions are each provided at their forward edges in the direction of the flight of the rocket, with lateral projection means for overlapping the forward edge of the outer portion of the said other of said fin mating portions and of the inner portion of the said one of said fin mating portions, respectively, when the corresponding fin is in its erected position.

References Cited

UNITED STATES PATENTS

| 1,448,166 | 3/1923 | Strong | 244—3.29 |
| 2,923,241 | 2/1960 | House | 244—3.29 |
| 3,103,886 | 9/1963 | Popenoe | 244—3.29 |
| 3,188,957 | 6/1965 | Petry | 244—3.27 |

FOREIGN PATENTS 745,252    2/1956    Great Britain.

BENJAMIN A. BORCHELT, *Primary Examiner.*

V. R. PENDEGRASS, *Assistant Examiner.*